United States Patent [19]
Cook

[11] Patent Number: 6,047,011
[45] Date of Patent: Apr. 4, 2000

[54] OPTICAL HARMONIC GENERATOR

[75] Inventor: Gary Cook, Malvern, United Kingdom

[73] Assignee: The Secretary of State for Defence in Her Majesty's Government of the United Kingdom of Great Britian and Northern Ireland, Farnborough, United Kingdom

[21] Appl. No.: 09/202,597
[22] PCT Filed: Jun. 30, 1997
[86] PCT No.: PCT/GB97/01734
  § 371 Date: Dec. 17, 1998
  § 102(e) Date: Dec. 17, 1998
[87] PCT Pub. No.: WO98/01790
  PCT Pub. Date: Jan. 15, 1998

[30] Foreign Application Priority Data

Jul. 4, 1996 [GB] United Kingdom .................. 9614037

[51] Int. Cl.[7] ...................................... H01S 3/10
[52] U.S. Cl. ................. 372/22; 372/21; 359/327
[58] Field of Search ............. 372/21, 22; 359/326, 359/327

[56] References Cited

U.S. PATENT DOCUMENTS 5,519,724  5/1996  Tatah ........................................ 372/22
5,912,910  6/1999  Sanders et al. ............................ 372/22

*Primary Examiner*—Leon Scott, Jr.
*Attorney, Agent, or Firm*—Nixon & Vanderhye P.C.

[57] ABSTRACT

An harmonic generator system for generating at least two output beams (6a, 6b, 6c) of higher order harmonic radiation from an input beam (1) of radiation of frequency ω comprises at least two non linear optical crystals (3a, 3b, 3c) arranged in series. Radiation output from each crystal stage has first and higher order harmonic components. Chromatic separators (5a, 5b, 5c) separate beams of radiation output from each crystal and selected beams are then passed through a telescope (9a, 9b) to the next crystal in the series, thereby generating further radiation beams of first and higher order harmonics. Multiple beams of second, 2ω, third 3ω, or fourth, 4ω, harmonic radiation may be output from the system and may be used to pump various stages of a secondary laser system or an optical parametric oscillator. Alternatively, the output beams of higher order harmonic radiation may be coherently combined to form a single output. The system is capable of yielding considerably high conversion efficiencies, approaching 100%. The system for generating multiple beams of second harmonic radiation preferably comprises a three non linear crystals, for example potassium titanyl phosphate (KTP) or potassium dihydrogen phosphate (KDP), such that three beams of second harmonic radiation are generated. The telescope magnofications may be variable so that the relative intensity of radiation output at each crystal stage may be varied.

22 Claims, 5 Drawing Sheets

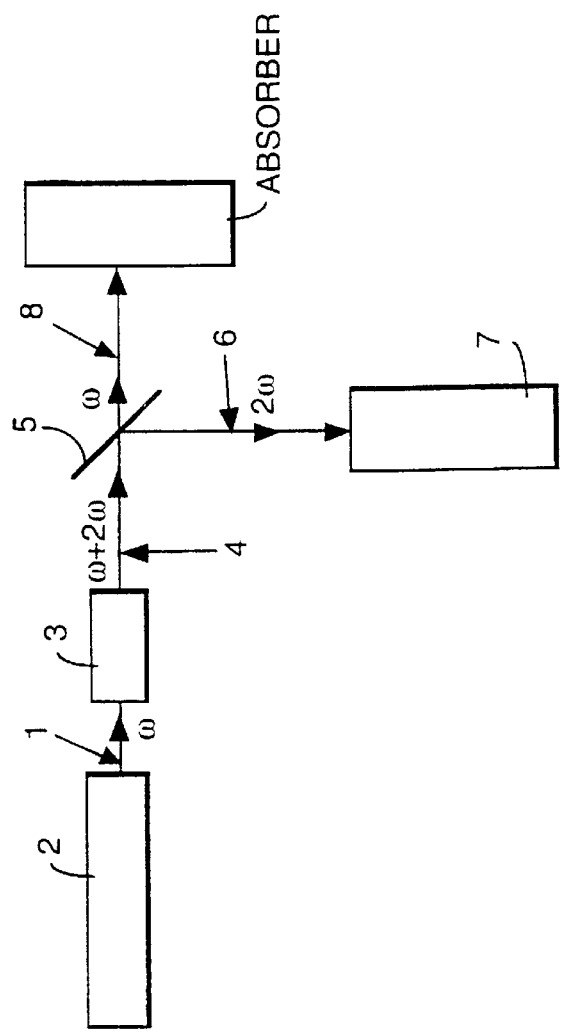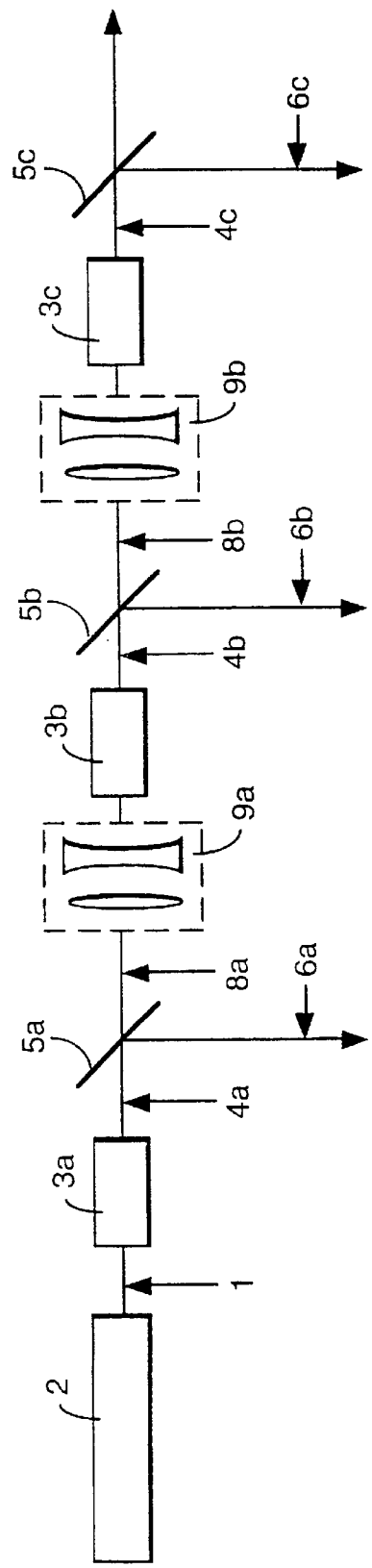

60 MW/cm²

90 MW/cm²

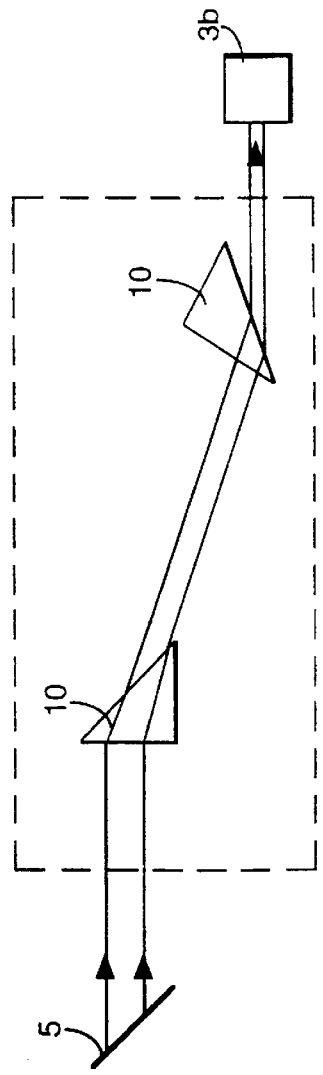
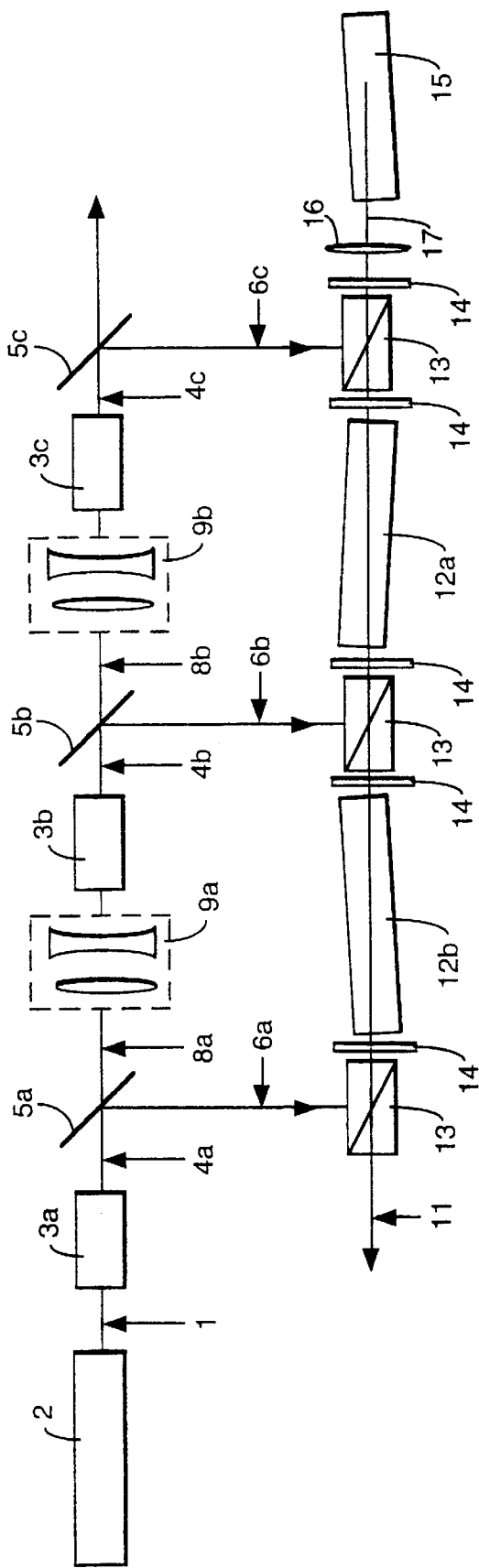
Fig.5.
Fig.6.

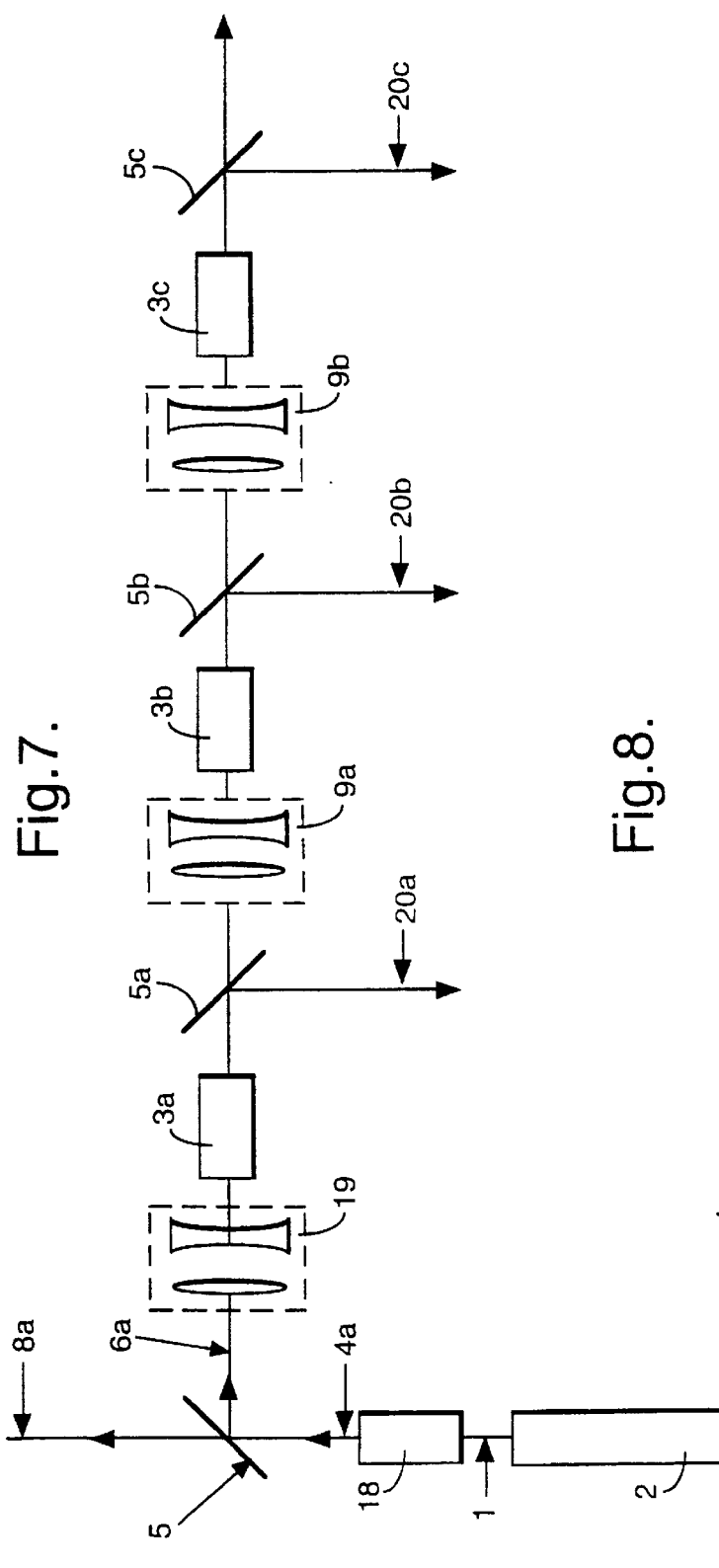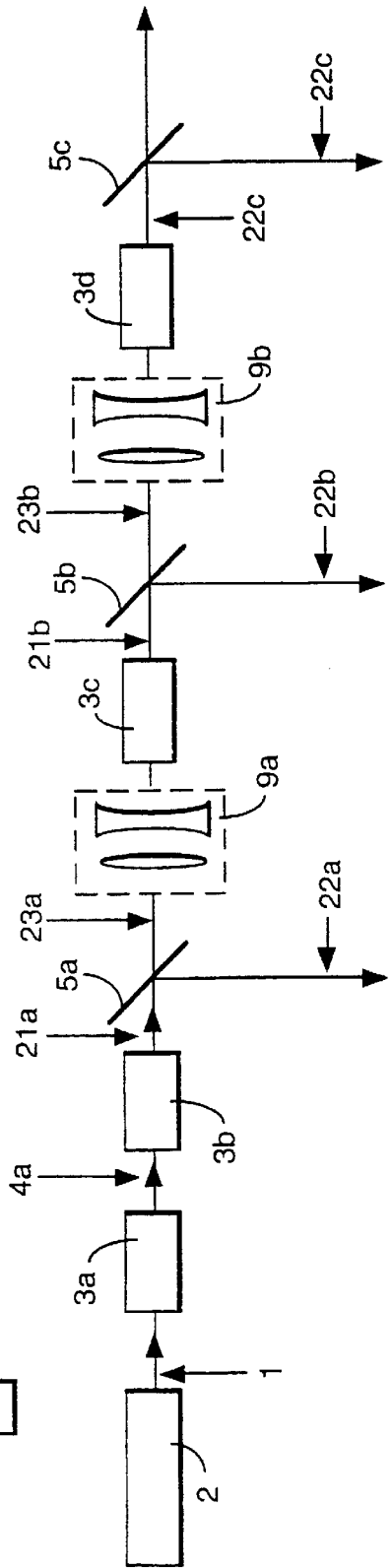

OPTICAL HARMONIC GENERATOR

The invention relates to an harmonic generator system for efficiently generating higher order harmonic radiation from an input beam of fundamental frequency radiation. In particular, the system may be used to generate beams of second, third or fourth harmonic radiation. The system is particularly suitable for use with lasers which are used to pump a secondary laser system as multiple output beams may be generated, each being used to drive separate stages of the laser system.

Conventionally, the generation of second harmonic frequencies, $2\omega$, may be achieved by irradiating an appropriate crystal with a beam of primary radiation of frequency $\omega$. Some fraction of the incident energy is converted into the second harmonic within the crystal. For example, crystals which may be used for the generation of second harmonic frequencies are potassium dihydrogen phosphate (KDP) and ammonium dihydrogen phosphate (ADP).

Second harmonics of a primary laser beam are often used to pump a secondary laser system, for example a dye laser. It is common in most secondary lasers of this type to sub-divide the pumping beam (the second harmonic) into a series of lower energy beams, graded in intensity, which are then used to pump the various stages of the secondary laser system such as the oscillators and the amplifiers.

The efficiency of the second harmonic generation process depends on the crystal material used and the power of the incident primary radiation. Typically, the efficiency with which second harmonics can be generated using a conventional frequency doubling crystal is only 50% to 60% of the primary laser source. The second harmonic may be separated using a prism arrangement or a dichoric mirror and the remaining fraction of fundamental radiation is wasted. Because of the limitation of the efficiency with which higher frequencies can be produced, powerful and bulky lasers may be needed in order to achieve sufficiently energetic second harmonic frequency beams for pumping applications.

The present invention relates to a system for generating a plurality of beams of multiple order harmonic radiation from an input beam of fundamental frequency radiation with a conversion efficiency approaching 100%. In particular, the system may be used to generate a plurality of beams of second, third or fourth harmonic radiation.

The system is particularly suitable for use with lasers which are used as pump sources for a secondary laser system as the output beams are conveniently split into separate beams which may be used to pump the separate stages of the secondary laser system. The system therefore enables a smaller and more convenient primary laser to be used to achieve sufficiently energetic beams of multiple order harmonic radiation than can be achieved using known techniques.

According to the present invention, a system for generating at least two output beams of higher order harmonic radiation from an input beam of fundamental radiation comprises;

a first sample of non linear optical material for receiving the input beam and generating output radiation comprising beams of fundamental and higher order harmonic radiation, means for separating the beams of fundamental radiation and higher harmonic radiation output from the first sample, at least one further sample of non linear optical material, wherein the first and further samples are arranged in series, each further sample having, associated means for increasing the intensity of radiation incident on the further sample and means for separating beams of fundamental and higher order harmonic radiation output from the further sample, wherein selected beams of radiation output from each of the first and further samples pass through the subsequent sample in the series and generate further beams of fundamental and higher order harmonic radiation.

In one embodiment of the invention, the first and further samples are arranged in series such that the beams of fundamental radiation output from each of the first and further samples pass through the next sample in the series, such that at least two output beams of second harmonic radiation may be generated. Preferably, the system comprises a first sample of non linear optical material and two further samples of non linear optical material, such that three output beams of second harmonic radiation may be generated.

The system may also comprise means for supplying the input beam of fundamental radiation. For example, the input beam of fundamental radiation may be supplied by a laser.

In another embodiment of the invention the system may also include a sub-system for deriving the input beam of radiation from a beam of primary radiation of frequency $\omega$, wherein said sub-system comprises;

an additional sample of non linear optical material for receiving the beam of primary radiation and generating output radiation comprising primary radiation, $\omega$, and second harmonic radiation $2\omega$, means for separating the beams of primary and second harmonic radiation output from the additional sample and means for increasing the intensity of radiation incident on the first sample, whereby the beam of second harmonic radiation output from the sub-system is input to the system, such that that system may be used to generate at least two output beams of fourth harmonic radiation.

In this embodiment of the invention, the system preferably comprises a first sample of non linear optical material and two further samples of non linear optical material such that three output beams of fourth harmonic radiation may be generated.

The system may also comprise means for supplying primary radiation to the sub-system, for example a laser.

The means for increasing the intensity of radiation incident on any of the first or further samples may be a refracting telescope, a system of reflecting telescopes or a system of anamorphic prisms.

The means for increasing the intensity of radiation incident on any of the first or further samples may have a variable magnification such that the relative intensities of the output beams of higher order harmonic radiation generated by the system may be varied by varying the magnification.

The means for separating fundamental radiation and higher harmonic radiation output from any of the first or further samples may be chromatic separators, for example dichroic mirrors, prisms or polarisers.

In another embodiment of the invention the system may also include a sub-system for deriving the input beam of radiation from a beam of primary radiation of frequency $\omega$, wherein said sub-system comprises;

an additional sample of non linear optical material for receiving the beam of primary radiation and generating output radiation comprising primary radiation, $\omega$, and second harmonic radiation, $2\omega$, whereby the beam of radiation output from the subsystem is input to the system such that the system may be used to generate at least two output beams of third harmonic radiation.

In this embodiment of the invention the system preferably comprises a first sample of non linear optical material two further samples of non linear optical material, such that three output beams of third harmonic radiation may be generated.

The system may also comprise means for providing primary radiation, for example a laser.

The additional, first or further samples of non linear optical material may be non linear optical crystals. For example, potassium titanyl phosphate (KTP), potassium dihydrogen phosphate (KDP), deuterated KDP (KD*P), caesium dihydrogen arsenate (CDA), deuterated CDA (CD*A), beta barium borate (BBO) or lithium triborate (LBO) are suitable-crystals.

The output beams of higher order harmonic radiation may be used to drive separate stages of a secondary laser system. Alternatively, the beams may be combined coherently to form a single output beam. For example, the means for coherently combining the output beams of higher harmonic radiation may comprise a stimulated Brillouin scattering (SBS) cell and at least one Brillouin amplifier.

The invention will now be described, by example only, with reference to the following figures in which;

FIG. 1 shows a diagram of a conventional system which may be used to produce frequency doubled radiation from a primary laser and which is then used to pump a secondary laser.

FIG. 2 shows a diagram of an improved efficiency system which may be used to produce three beams of frequency doubled radiation from a primary laser.

FIG. 5 shows a diagram of a system of anamorphic prisms which may be used to increase the intensity of fundamental frequency radiation incident on each crystal.

FIG. 6 shows a diagram of a system which may be used to coherently combine several second harmonic radiation beams outputs from the system shown in FIG. 2.

FIG. 7 shows how the system of the present invention may be used to generate output beams of fourth harmonic radiation from a fundamental frequency beam and FIG. 8 shows how the system of the present invention may be used to generate output beams of third harmonic radiation from a fundamental frequency beam.

Figure 3A:
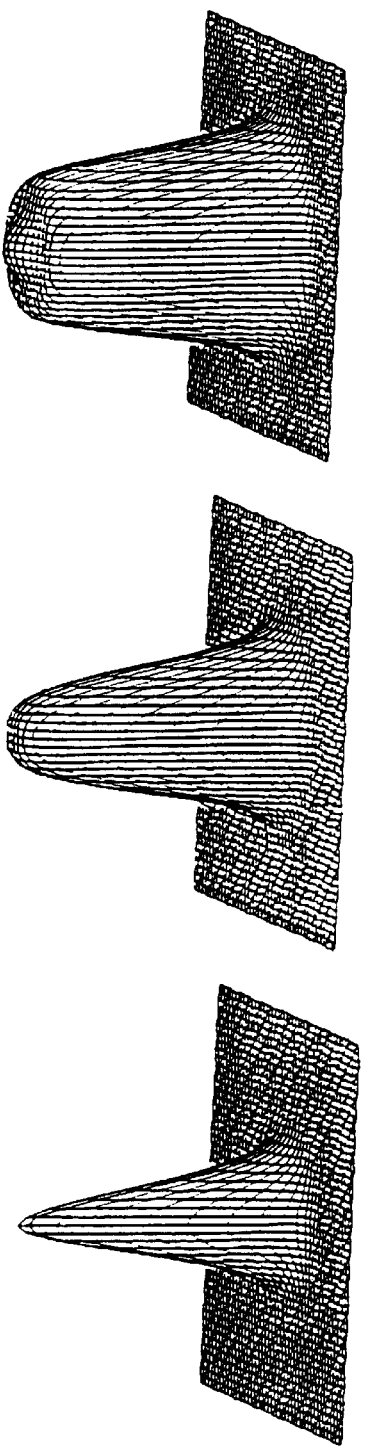
FIG. 3 shows the spatial profiles of second harmonic generated beams at each of three crystal stages (as shown in FIG. 2) for (a) 60 MW/cm$^2$ and (b) 90 MW/cm$^2$ beams.

Referring to FIG. 1, an incident beam of radiation 1, with frequency $\omega$, is emitted from a primary laser 2 and is passed through a frequency doubling crystal 3. As a result, some fraction of the initial fundamental energy is converted into the second harmonic of frequency $2\omega$. The radiation 4 exiting the crystal 3 therefore comprises components of radiation with frequencies of $\omega$ and $2\omega$. The frequencies may then be separated by means of a dichroic separator 5, for example a dichroic mirror, or any other chromatic separator, such as a prism. The second harmonic beam 6 may then be used to pump a secondary laser 7. The conversion efficiency of this system would typically be 50% to 60%.

An improved second harmonic efficiency may be achieved by using the system shown in FIG. 2. The primary laser 2 emits a beam of fundamental radiation 1 with frequency $\omega$. The radiation 1 is then passed through a series of frequency doubling crystals 3a,3b,3c, dichroic mirrors 5a,5b,5c and telescopes 9a,9b. The crystals may be any non linear optical crystal capable of generating second harmonic frequencies of incident fundamental frequency radiation. For example, suitable chi(2) materials which may be used are potassium titanyl phosphate (KTP), potassium dihydrogen phosphate (KDP), deuterated KDP (KD*P), caesium dihydrogen arsenate (CDA), deuterated CDA (CD*A), beta barium borate (BBO) and lithium triborate (LBO). The crystals used may all be of the same material or various different crystals may be used. Typically the crystals have a pathlength of 10 mm.

On passing through the first crystal 3a, the primary radiation of frequency $\omega$ gives rise to radiation having second harmonic frequency components. The beam of radiation 4a transmitted by the crystal 3a therefore contains frequency components $\omega$ and $2\omega$. The dichroic mirror 5a separates the frequencies so that the fundamental frequency beam 8a is passed to a refracting telescope 9a while the frequency doubled beam 6a may be passed to a secondary laser system (not shown) for pumping purposes. Again, a polariser or a prism may be used instead of the dichroic mirror 5a to separate the beams of fundamental and second harmonic frequency radiation.

On passing through the telescope 9a, the diameter of the fundamental frequency beam 8a is reduced so that the intensity is high enough on entering the second crystal 3b to allow efficient conversion. The demagnifying power of the telescope is usually chosen to restore the peak intensity to a similar level as the primary fundamental frequency beam 1. By making the magnification of each telescope variable, the relative intensity of second harmonic radiation generated at each crystal stage may be varied. A telescope may also be mounted in front of the first crystal 3a to increase the intensity of fundamental frequency radiation entering the first crystal, although this is not essential.

On passing through the second crystal 3b, the fundamental frequency beam 8a gives rise to the generation of second harmonic frequencies. As before, a dichroic mirror 5b may be used to separate the fundamental frequency beam 8b and the frequency doubled beam 6b. The frequency doubled beam 6b may then be used to pump a secondary laser (not shown) while the fundamental frequency beam 8b is passed through a third crystal 3c and the process is repeated.

The conversion efficiency obtained using the system shown in FIG. 2 depends on the particular crystals used, the number of crystal stages in the system and the telescope demagnifications. By using a combination of three KTP crystals, each separated by a telescope and a dichroic mirror, a second harmonic conversion efficiency of greater than 97% may be achieved. Additional crystals, telescopes and dichroic mirrors may be included to increase the efficiency further, with diminishing return as the residual fundamental energy is used up. However, since the residual fundamental energy is telescoped down at each crystal, the required crystal size becomes increasingly smaller at each stage.

Using the system shown in FIG. 2 with a 10 Hz, injection seeded Nd:YAG laser and three KTP crystals, a total conversion efficiency from 1.06 $\mu$m fundamental radiation to 532 nm radiation of greater than 97% may be obtained. In this case, the initial 1.06 $\mu$m energy was 207 mJ and the triple conversion resulted in a total of 201 mJ of 532 nm laser radiation and compares to a single KTP crystal conversion of approximately 65%.

Adding three crystals in series without dichoric mirrors and telescopes does not increase the efficiency notably beyond that of a single crystal and under certain conditions may even reduce the second harmonic output. This is partly due to phase matching requirements and the reduced intensity of the fundamental frequency beam as the second harmonic beam is generated.

The multiple beams generated using the second harmonic generator system shown in FIG. 2 are particularly useful for pumping secondary lasers and similar devices as the total harmonic radiation is conveniently separated into beams of graded energy. In conventional systems, it is usual to separate a single second harmonic pump laser beam into several fractions to separately pump oscillator, preamplifier and power amplifier stages of the secondary laser system. The need for a series of beam splitters to divide up a single beam is therefore eliminated in the present system.

The last second harmonic beam generated 6c will be the weakest and is therefore ideally suited to pump a laser oscillator or an optical parametric oscillator. The penultimate beam 6b will be of higher energy and may therefore be used to drive a laser preamplifier or optical parametric preamplifier. The first second harmonic beam 6a generated has the greatest energy and is therefore ideally suited for pumping a power amplifier stage.

Figure 3B:
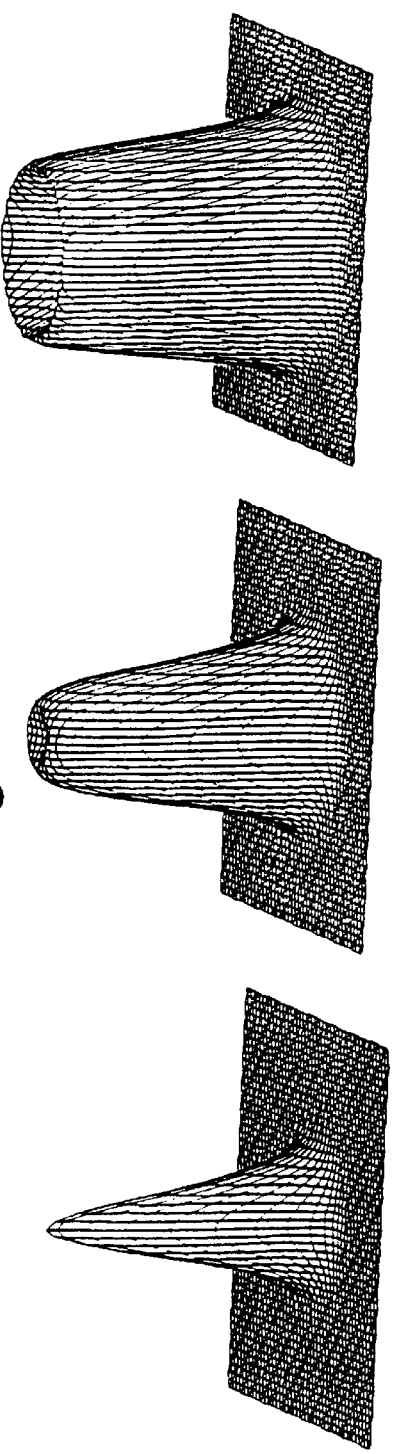
Figure 4A:
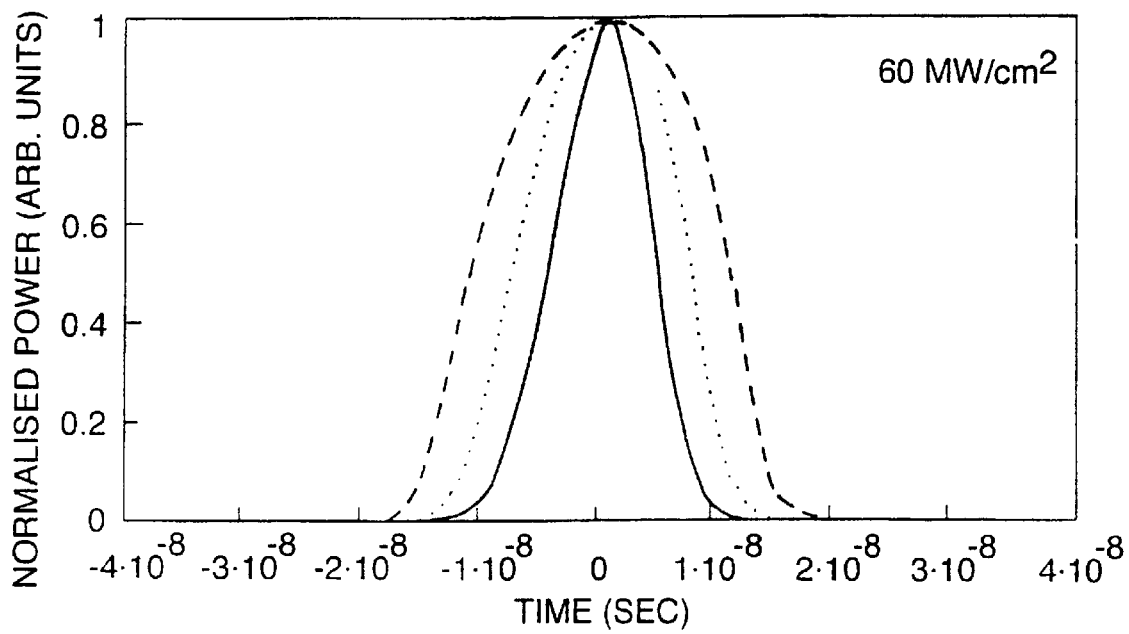
FIG. 4 shows the temporal profiles of second harmonic generated beams at each of three crystal stages (as shown in FIG. 2) for (a) 60 MW/cm$^2$ and (b) 90 MW/cm$^2$ beams.
Figure 4B:
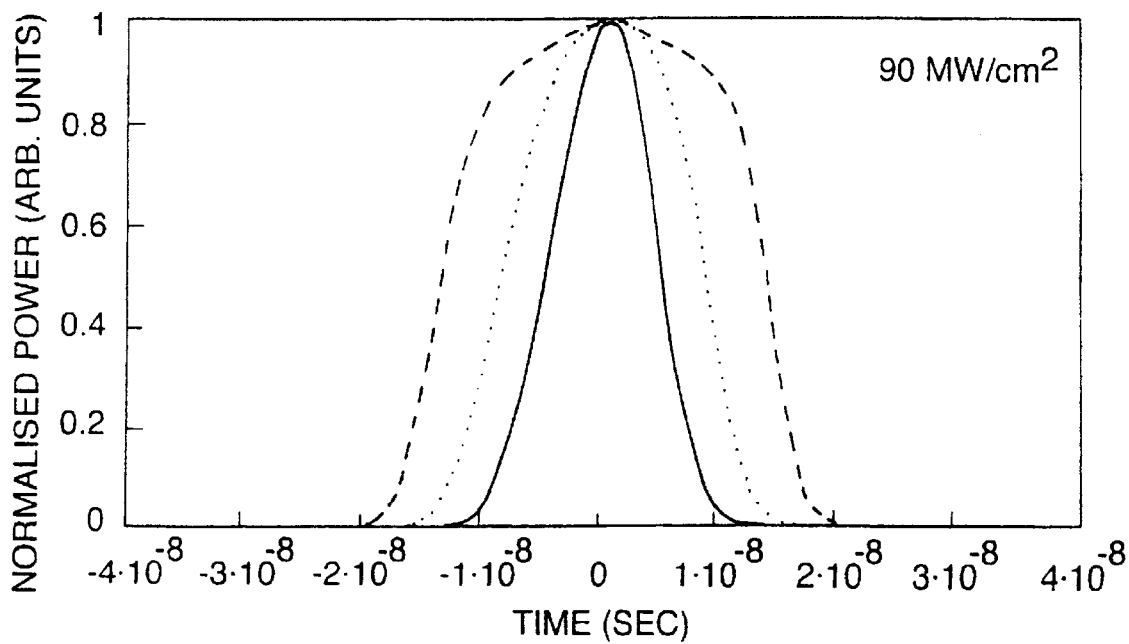

FIG. 3 shows the theoretical three stage spatial profiles of generated second harmonic beams for input beams of 60 MW/cm$^2$ (FIG. 3($a$)) and 90 MW/cm$^2$ (FIGS. 3($b$)). FIG. 4 shows the three stage temporal profiles of generated second harmonic beams for input beams of 60 MW/cm$^2$ (FIG. 4($a$)) and 90 MW/cm$^2$ (FIGS. 4($b$)). A useful feature of the system is that the duration of the second harmonic pulses that are generated 6a,6b,6c progressively lengthen and the spatial profiles of the pulses can be made more flat-topped with each successive crystal stage. This is due to the effects of pump depletion. This feature makes the system particularly suitable to provide a pump source for optical parametric oscillators and other laser systems as the flat topped spatial profile can reduce the risk of damage and the corresponding longer pumping pulse can help to provide a better temporal overlap between the oscillator output pulse and the subsequent amplifier pump pulses.

The conversion efficiency associated with each successive stage also becomes progressively higher due to the flattening of the temporal and spatial profiles. For example, the theoretical conversion efficiencies for three crystal stages (in sequential order) for an initial Gaussian 60 MW/cm$^2$ peak input intensity are 52%, 75% and 81%, giving a total conversion of nearly 98%. the increased conversion efficiencies at the second and third stages are due to the flattening of the spatial profile.

Almost complete conversion into the second harmonic is possible with higher initial pumping intensities. For example, 99.6% conversion may be achieved for a 90 MW/cm$^2$ Nd:YAG 1.06 $\mu$m beam, but the relatively small gain in overall efficiency can have a detrimental effect For such strong initial pumping intensities the output spatial and temporal profiles can become distorted, particularly at the third stage, due to the high pump depletion. In practice, however, for most laboratory sources with Gaussian beams, it becomes difficult to employ telescopes with the ideal demagnifications necessary to cope with conversion efficiencies much in excess of 50% for the first crystal stage. The reduced beam diameters, particularly at the third stage, and the physical length of the telescopes make it difficult to remain in the near field and preserve intensity over realistic propagation distances.

Relay imaging between the crystal stages could be used to allow near field conversion at any demagnification but vacuum telescopes would be needed to avoid air breakdown at the intermediate foci. Less bulky Galilean telescopes are a more practical solution for moderate demagnifications.

It is not necessary, however, to precisely reproduce peak intensities at each stage in order to achieve a high overall conversion efficiency. The exact spatial and temporal profiles achieved at each crystal stage can be controlled by an appropriate choice of the preceding telescope, within the limitations of the required overall conversion efficiency. For example, it is possible to achieve a high conversion efficiency for the first crystal stage and then obtain a more moderate conversion (than would be possible for a fully restored peak intensity) at each of the subsequent two stages by using lower demagnification telescopes. Even though strong pump depletion occurs at the first stage, the moderated conversion efficiencies for the subsequent harmonic generators can allow good quality beams to be generated at all stages.

Furthermore, the crystals 3a,3b3c may be mounted such that the angle at which incident radiation enters each one may be varied. By varying this angle the amount of second harmonic radiation generated at each state (6a,6b,6c) may be varied, although in most cases the maximum possible output is likely to be required.

Referring to FIG. 5, a system of anamorphic prisms 10 may be used instead of the refracting telescopes 9a,9b (see FIG. 2) in order to increase the intensity of radiation incident on each of the crystals 3a,3b,3c. Alternatively, a system of reflecting telescopes may be used or a system axis parabolic mirrors.

Referring to FIG. 6, the second harmonic beams 6a, 6b, 6c may also be coherently combined to form a single output 11. A stimulated Brillouin scattering (SBS) cell 15 imparts a small frequency downshift to the second harmonic signal 6c and generates an output signal 17. The frequency downshift is equivalent to the acoustic frequency characteristic of the Brillouin material. Suitable materials for use in the SBS cell would be liquid N-hexane, liquid N-pentane or gaseous $C_2F_6$.

In this configuration, the second harmonic signal 6c is used as the input signal to a Brillouin amplifier 12a and one of the other second harmonic signals 6b is used to pump this amplifier. The amplified output from this Brillouin amplifier 12a becomes the signal for a second Brillouin amplifier 12b, and so forth depending on the number of second harmonic outputs from the system.

Porsers 13 and quarter wave plates 14 are used to direct the pump beams into the Brillouin amplifiers and to convert linearly polarised radiation into circularly polarised radiation with the polarisers 13 and quarter wave plates 14 arranged such that beams 6a and 6b do not reach the SBS cell 15. As the signal 17 proceeds through the Brillouin amplifiers, energy in beams 6a and 6b is imparted to 6c, resulting in a single combined output beam 11.

In principle, amplification can proceed in either direction, starting with either the weakest or the strongest beam, but since the SBS cell efficiency is never 100% efficient it is preferable to derive the amplifier signal from the weakest beam (i.e. 6c) within the threshold limitations of the SBS cell.

Mode matching optics, for example telescopes (not shown), are also included between the Brillouin amplifiers 12a, 12b as the various beams are of different initial diameters, and to reach the required gIL value (Brillouin gain) for the efficient operation of the Brillouin amplifiers. Optical delay lines (not shown) are also included in beams 6a,6b,6c to ensure proper temporal overlap of the various beams in the Brillouin amplifiers 12a,12b.

Using the system shown in FIG. 6, an intrinsic SBS conversion efficiency of up to 95% may be achieved, giving an total frequency doubling efficiency of 97%×95%=92%. This is a considerable improvement on the frequency doubling efficiencies typically obtained with a single KTP crystal (typically 60%).

Referring to FIG. 7, the principle behind the system may also be used to generate multiple beams of radiation with four times the frequency of the fundamental radiation, 4ω (fourth harmonic generation). In this case an additional frequency doubling crystal 18 is used and the output beam 4a from this crystal will have fundamental and second harmonic frequency components which may then be separated by a chromatic separator 5a. The crystals for use in this system may be any of one the examples mentioned previously.

The separated second harmonic beam 6a then becomes the input beam to a three crystal system shown in FIG. 2 (i.e. the beam input to the first of the three crystals has frequency 2ω), with the addition of a third telescope 19 mounted in front of the first of the three crystals 3a. The system therefore generates three output beams 20a,20b,20c of four times the frequency of the fundamental beam (and two times the frequency of beam 6a). As described previously for second harmonic beams the fourth harmonic output beams 20a,20b,20c may be used separately to drive individual stages of an amplifier system or may be combined coherently to form a single output. Referring to FIG. 8, the principle behind the system may be used to generate multiple beams of radiation with three times the frequency of the fundamental radiation from the laser source (third harmonic generation). Fundamental frequency radiation 1 from the laser 2 enters a first second harmonic crystal 3a. This crystal is chosen and adjusted so that approximately 67% conversion efficiency into the second harmonic is achieved. At this conversion efficiency, the fundamental harmonic photons and the second harmonic photons are matched in numbers.

The conversion process for generating third harmonic radiation involves adding together one photon having fundamental frequency, ω, to one photon having second harmonic frequency, 2ω, therefore generating a photon with third harmonic frequency, 3ω, which is equal in energy to the sum of the first and second harmonic photons. The radiation 4a output from the first crystal 3a is then passed through a second crystal 3b so as to generate third harmonic radiation. Assuming that the conversion efficiency is less than 100%, radiation 21a emerging from the second crystal 3b will contain radiation having frequency components ω, 2ω and 3ω. A first dichroic separator 5a is then used to split off the third harmonic radiation 22a.

After passing through the first dichroic separator 5a, the residual radiation beam 23a containing fundamental and second harmonic frequency components is passed through a telescope 9a to reduce the beam size. This increases the intensity of radiation 23a and ensures that the conversion efficiency is high when the radiation passes through the subsequent crystal in the chain, crystal 3c.

The process is then repeated; a second dichroic separator 5b separates third harmonic radiation 22b generated in the crystal 3c and residual radiation 23b (having frequency components ω and 2ω), residual radiation is passed through a second telescope 9b and enters a third crystal 3d, generating a third output beam of third harmonic radiation 22c.

The crystals for use in the system of FIG. 8 may be any of one the examples mentioned previously. The beam transmitted by each of the dichroic separators 5a,5b,5c contain two frequency components, ω and 2ω, and it is important that these two wavelengths remain together in a single beam prior to entering the next telescope in the sequence. The dichroic separators and the telescopes must therefore be free from chromatic aberrations and prisms may not be used in this particular embodiment of the invention. Polarisers, however, could be used.

Likewise, the telescopes 9a,9b,9c must be achromatic and cannot be replaced by anamorphic prisms (as described previously for second and fourth harmonic generation systems). Mirror telescopes would be suitable for use in the third harmonic generation system.

If the numbers of ω and 2ω photons are not balanced after the first crystal stage, the conversion into the second harmonic is not maximised and the conversion efficiency at each of the subsequent stages is reduced. The system would therefore generate third harmonic radiation with a lower conversion efficiency.

I claim:

1. A system for generating an output beam of higher order harmonic radiation from an input beam of fundamental radiation comprising;

a first sample of non linear optical material for receiving the input beam and generating output radiation comprising beams of fundamental and higher order harmonic radiation, means for separating the beams of fundamental radiation and higher harmonic radiation output from the first sample, at least one further sample of non linear optical material, wherein the first and further samples are arranged in series, each further sample having associated means for increasing the intensity of radiation incident on the further sample and means for separating beams of fundamental and higher order harmonic radiation output from the further sample, wherein selected beams of radiation output from each of the first and further samples pass through the subsequent sample in the series and generate further beams of fundamental and higher order harmonic radiation, characterised in that the apparatus further comprises a stimulated Brillouin scattering (SBS) cell and at least one Brillouin amplifier for coherently combining the output beams of higher order harmonic radiation.

2. The system of claim 1, the first and further samples generating at least two output beams of second harmonic radiation, the two or more output beams of second harmonic radiation being coherently combined by means of the stimulated Brillouin scattering (SBS) cell and the one or more Brillouin amplifier.

3. The system of claim 2 comprising a first sample of non linear optical material and two further samples of non linear optical material for generating three output beams of second harmonic radiation, the three output beams of second harmonic radiation being coherently combined by means of the stimulated Brillouin scattering (SBS) cell and the one or more Brillouin amplifier.

4. The system of claim 1, and also comprising means for supplying the input beam of fundamental radiation.

5. The system of claim 4 wherein the means for supplying the input beam of fundamental radiation is a laser.

6. The system of claim 1, and also including a sub-system for deriving an input beam of radiation from a beam of primary radiation of frequency ω, wherein said sub-system comprises;

an additional sample of non linear optical material for receiving the beam of primary radiation and generating output radiation comprising primary radiation, ω, and second harmonic radiation, 2ω, means for separating the beams of primary and second harmonic radiation output from the additional sample and means for increasing the intensity of radiation incident on the first sample, whereby the beam of second harmonic radiation output from the sub-system is input to the system, such that that system may be used to generate at least two output beams of fourth harmonic radiation, the two or more output beams of fourth harmonic radiation being coherently combined by means of the stimulated Brillouin scattering (SBS) cell and the one or more Brillouin amplifier.

7. The system of claim 6 comprising a first sample of non linear optical material and two further samples of non linear optical material such that three output beams of fourth harmonic radiation may be generated, the two or more output beams of fourth harmonic radiation being coherently combined by means of the stimulated Brillouin scattering (SBS) cell and the one or more Brillouin amplifier.

8. The system of claim 7, and also comprising means for supplying primary radiation to the sub-system.

9. The system of claim 8 wherein the means for supplying primary radiation to the sub-system is a laser.

10. The system of claim 1 wherein the means for increasing the intensity of radiation incident on any of the first, additional or further samples is system of anamorphic prisms.

11. The system of claim 1 wherein the means for increasing the intensity of radiation incident on any of the first or further samples is a refracting telescope.

12. The system of claim 1 wherein the means for increasing the intensity of radiation incident on any of the first or further samples is system of reflecting telescopes.

13. The system of claim 1 wherein the means for separating fundamental radiation and higher harmonic radiation output from any of the first, additional or further samples are chromatic separators.

14. The system of claim 13 wherein the chromatic separators are any one of dichroic mirrors, prisms or polarisers.

15. The system of claim 1, and also including a sub-system for deriving an input beam of radiation from a beam of primary radiation of frequency ω, wherein said sub-system comprises;

an additional sample of non linear optical material for receiving the beam of primary radiation and generating output radiation comprising primary radiation, ω, and second harmonic radiation, 2ω, whereby the beam of radiation output from the sub-system is input to the system such that the system may be used to generate at least two output beams of third harmonic radiation, the two or more output beams of third harmonic radiation being coherently combined by means of the stimulated Brillouin scattering (SBS) cell and the one or more Brillouin amplifier.

16. The system of claim 15, comprising a first sample of non linear optical material and two further samples of non linear optical material, such that three output beams of third harmonic radiation may be generated, the three output beams of third harmonic radiation being coherently combined by means of the stimulated Brillouin scattering (SBS) cell and the one or more Brillouin amplifier.

17. The system of claim 16 and also comprising means for providing primary radiation.

18. The system of claim 17 wherein the means for providing primary radiation is a laser.

19. The system of claim 1 wherein any of the samples of non linear optical material are non linear optical crystals.

20. The system of claim 19 wherein any one of the non linear optical crystals, is any one of a potassium titanyl phosphate (KTP) crystal, a potassium dihydrogen phosphate (KDP) crystal, a deurated KDP (KD*P), caesium dihydrogen arsenate (CDA) crystal, a deuterated CDA (CD*A), a beta barium borate (BBO) crystal or a lithium triborate (LBO) crystal.

21. The system claim 1 wherein the means for increasing the intensity of radiation incident on any of the first, additional or further samples have a variable magnification such that the relative intensities of the beams of higher order harmonic radiation output from the system may be varied by varying the magnification.

22. The system of claim 1, and further comprising optical delay lines included in the beams of higher order radiation to ensure temporal overlap of the beams in the one or more Brillouin amplifier.

* * * * *